(12) United States Patent
Ikoma et al.

(10) Patent No.: US 8,575,054 B2
(45) Date of Patent: Nov. 5, 2013

(54) CATALYST FOR PURIFYING ORGANIC NITROGEN COMPOUND-CONTAINING EXHAUST GAS AND METHOD FOR PURIFYING THE EXHAUST GAS

(75) Inventors: Tomoo Ikoma, Hiratsuka (JP); Takanobu Sakurai, Hiratsuka (JP); Yoshiki Nakano, Hiratsuka (JP)

(73) Assignee: Nikki-Universal Co., Ltd., Tokyo (JP)

( * ) Notice: Subject to any disclaimer, the term of this patent is extended or adjusted under 35 U.S.C. 154(b) by 602 days.

(21) Appl. No.: 11/572,095

(22) PCT Filed: Jul. 15, 2005

(86) PCT No.: PCT/JP2005/013171
§ 371 (c)(1),
(2), (4) Date: Jan. 12, 2007

(87) PCT Pub. No.: WO2006/006702
PCT Pub. Date: Jan. 19, 2006

(65) Prior Publication Data
US 2007/0286786 A1    Dec. 13, 2007

(30) Foreign Application Priority Data
Jul. 15, 2004  (JP) ................. 2004/208279

(51) Int. Cl.
*B01D 53/56*    (2006.01)
(52) U.S. Cl.
USPC ............ 502/60; 423/239.2; 423/351; 502/77; 502/74; 502/71; 502/66
(58) Field of Classification Search
USPC ..................... 423/213, 143, 239
See application file for complete search history.

(56) References Cited

U.S. PATENT DOCUMENTS

| 5,254,327 | A | * | 10/1993 | Martinez et al. | ............. 423/718 |
| 5,358,916 | A | * | 10/1994 | Shiokawa et al. | ............. 502/65 |
| 6,641,788 | B1 | * | 11/2003 | Ogawa et al. | ............. 423/213.2 |
| 2006/0185336 | A1 | * | 8/2006 | Nakano et al. | ............. 55/524 |

FOREIGN PATENT DOCUMENTS

| EP | 0514729 A2 | 11/1992 |
| EP | 0800855 A1 | 10/1997 |
| JP | 05-115751 | * 5/1993 |
| JP | 06-000334 | 1/1994 |

(Continued)

OTHER PUBLICATIONS

Busca et al., Abatement of ammonia and amines from waste gases: a summary, Journal of Loss Prevention in the process industries, vol. 16, No. 2, Mar. 1, 2003, pp. 157-163, 7 pages.

(Continued)

*Primary Examiner* — Melvin C Mayes
*Assistant Examiner* — Colette Nguyen
(74) *Attorney, Agent, or Firm* — Fish & Richardson P.C.

(57) ABSTRACT

The present invention provides a catalyst composition which can decompose an organic nitrogen compound at a relatively low temperature to convert the compound to $N_2$ and render it harmless in the purification of an exhaust gas containing the compound (nitrogen-based exhaust gas); a catalyst containing the catalyst composition; a method for producing the catalyst; and an exhaust gas purification apparatus containing the catalyst.

By using a catalyst composition formed by mixing copper oxide particles and zeolite particles, an organic nitrogen compound and/or ammonia can be converted to $N_2$ highly selectively. The catalyst composition of the present invention may further contain a manganese oxide and/or a precious metal.

7 Claims, 3 Drawing Sheets

(56) References Cited

FOREIGN PATENT DOCUMENTS

| | | | |
|---|---|---|---|
| JP | 07-284670 | * | 10/1995 |
| JP | 08-173766 | | 7/1996 |
| JP | 09-299461 | * | 11/1997 |
| JP | 10249165 A | | 9/1998 |
| JP | 2001-293480 | | 10/2001 |
| JP | 2004-058019 | | 2/2004 |
| JP | 2004-167306 | | 6/2004 |
| WO | 03051493 A2 | | 6/2003 |

OTHER PUBLICATIONS

Supplementary European Search Report for Application No. EP05766375, dated Jul. 26, 2011, 9 pages.

* cited by examiner

CATALYST FOR PURIFYING ORGANIC NITROGEN COMPOUND-CONTAINING EXHAUST GAS AND METHOD FOR PURIFYING THE EXHAUST GAS

TECHNICAL FIELD

This invention relates to a catalyst composition for converting an exhaust gas, which contains an organic nitrogen compound, ammonia, or a combination of them, directly into $N_2$ to purify the exhaust gas, a catalyst containing the catalyst composition, and a method for treating the exhaust gas.

BACKGROUND ART

An exhaust gas containing an organic nitrogen compound or ammonia (hereinafter referred to as a nitrogen-based exhaust gas) frequently has a foul odor, and is often harmful to the human body. Thus, its treatment is demanded.

Precious metal catalysts such as platinum or palladium, have hitherto been used for the treatment of the nitrogen-based exhaust gas. These catalysts have high decomposition activity for organic nitrogen compounds and ammonia, but have high selectivity for $NO_x$, such as NO and $NO_2$. Thus, the resulting $NO_x$ needs to be further reduced into $N_2$ with the use of denitrification catalysts.

The following examples have been reported as catalysts with high N, selectivity. Firstly, there is a report of a catalyst in which a metal such as Cu has been sulfated and supported on a silica carrier (see patent document 1). With this catalyst, however, the metal has to be kept sulfated during the reaction, so that a volatile sulfur compound needs to be added to the exhaust gas.

Next, there is a report of a catalyst having a vanadium oxide, a tungsten oxide, and palladium carried on titania and/or titania silica, and it is also described that a copper compound can be used Instead of the vanadium oxide and the tungsten oxide (patent document 2). However, the use of the copper compound is considered to result in poor activity, and a further improvement is demanded.

Moreover, a catalyst having a Cu compound supported on carriers such as $Al_2O_3$ and zeolite it also described (see patent document 3). This catalyst is deemed to convert acrylonitrile to $N_2$ at a high selection rate, but there is a demand for a catalyst which has a higher $N_2$ selection rate and which can be prepared by a simple method.

Furthermore, a catalyst for purification of $NO_x$, which contains copper oxide, ZSM5 and/or zeolite β, and an oxide of at least one element among magnesium, calcium and silver, is reported for treatment of $NO_x$ in an exhaust gas of a diesel engine (see patent document 4). When this catalyst is applied to the decomposition of an organic nitrogen compound, the problem arises that the production of CO and $NH_3$, which are by-products, increases and the rate of conversion Into $N_2$ decreases.

Patent document 1: Japanese Unexamined Patent Publication No. 1996-173766
Patent document 2: Japanese Unexamined Patent Publication No. 2001-293480
Patent document 3: Japanese Unexamined Patent Publication No. 2004-58019
Patent document 4: Japanese Unexamined Patent Publication No. 2004-167306

DISCLOSURE OF THE INVENTION

Problems to be Solved by the Invention

The present Invention has been accomplished in the light of the above-described situations. The invention provides a catalyst composition which decomposes an organic nitrogen-containing compound or a nitrogen-containing compound such as ammonia at a relatively low temperature to convert such a compound to $N_2$ selectively, while suppressing the formation of a by-product such as $NO_x$, HCN, $NH_3$, or CO, in the purification of a nitrogen-based exhaust gas, namely, a highly $N_2$ selective catalyst composition: a catalyst containing the catalyst composition; and a method for treating the exhaust gas.

Means for Solving the Problems

The inventors diligently conducted studies in an attempt to solving these problems. As a result, they have found that high $N_2$ selectivity is obtained by using a catalyst composition formed by mixing copper oxide particles and zeolite particles. This finding has led to the accomplishment of the present invention.

That is, the present invention provides the following:

(1) A catalyst composition for purifying an exhaust gas containing an organic nitrogen compound, ammonia, or a combination thereof, the catalyst composition containing a copper oxide and zeolite.

(2) A catalyst composition for purifying an exhaust gas containing an organic nitrogen compound, ammonia, or a combination thereof, the catalyst composition being formed by mixing copper oxide particles and zeolite particles.

(3) The catalyst composition described in (1) or (2), wherein the weight of the copper oxide relative to the sum of the weight of the copper oxide and the weight of the zeolite is in the range of 0.1 wt. % to 40 wt. %.

(4) The catalyst composition described in any one of (1) to (3), further containing a manganese oxide.

(5) The catalyst composition described in (4), wherein the weight of the manganese oxide relative to the sum of the weight of the copper oxide and the weight of the zeolite is in the range of 0.1 wt. % to 10 wt. %.

(6) The catalyst composition described in any one of (1) to (5), further containing one or more members selected from the group consisting of Pt, Pd, Ru, Rh, Ir and an alloy thereof.

(7) The catalyst composition described in (6), wherein the sum of the weights of the one or more members selected from the group consisting of Pt, Pd, Ru, Rh, Ir and an alloy thereof relative to the sum of the weight of the copper oxide and the weight of the zeolite is in the range of 1 ppm to 500 ppm.

(8) The catalyst composition described in (6) or (7), produced by mixing inorganic oxide particles selected from the group consisting of silica, titania, and alumina having, carried thereon, the one or more members selected from the group consisting of Pt, Pd, Ru, Rh, Ir and an alloy thereof.

(9) The catalyst composition described in any one of (1) to (8), wherein the $SiO_2/Al_2O_3$ molar ratio of the zeolite is 3 to 70, and the zeolite is one or more of zeolites of a proton type, or is one or more of zeolites ion-exchanged with a Group 8 metal, a Group 9 metal, a Group 10 metal or a Group 11 metal.

(10) The catalyst composition described in any one of (1) to (9), wherein the $SiO_2/Al_2O_3$ molar ratio of the zeolite is 5 to 50.

(11) The catalyst composition described in any one of (1) to (10), wherein the zeolite is of a proton type, and is one or more of mordenite, MFI, and d type zeolite.

(12) A catalyst for purifying an exhaust gas containing an organic nitrogen compound, ammonia, or a combination thereof, the catalyst comprising:

a catalyst substrate: and a catalyst layer formed on the catalyst substrate and containing the catalyst composition described in any one of (1) to (11).

(13) A method for producing a catalyst composition for purifying an exhaust gas containing an organic nitrogen compound, ammonia, or a combination thereof, comprising the step of:

mixing copper oxide particles and zeolite particles.

(14) A method for producing a catalyst for purifying an exhaust gas containing an organic nitrogen compound, ammonia, or a combination thereof, comprising the steps of:

mixing copper oxide particles, zeolite particles, and silica particles and/or titania particles to form a mixture, the silica particles and/or the titania particles having, carried thereon, one or more members selected from the group consisting of Pt, Pd, Ru, Rh, Ir and an alloy thereof:

forming the mixture into a slurry; and coating the slurry onto a catalyst substrate to form a catalyst layer.

(15) A method for treating an exhaust gas, comprising the step of:

bringing an exhaust gas containing an organic nitrogen compound, ammonia, or a combination thereof into contact with a catalyst at 250 to 600° C. to convert the exhaust gas into $N_2$, the catalyst containing a catalyst composition formed by mixing a copper oxide powder, a zeolite powder, and silica particles and/or titania particles, the silica particles and/or the titania particles having, carried thereon, one or more members selected from the group consisting of Pt, Pd, Ru, Rh, Ir and an alloy thereof.

BEST MODE FOR CARRYING OUT THE INVENTION

Figure 1:
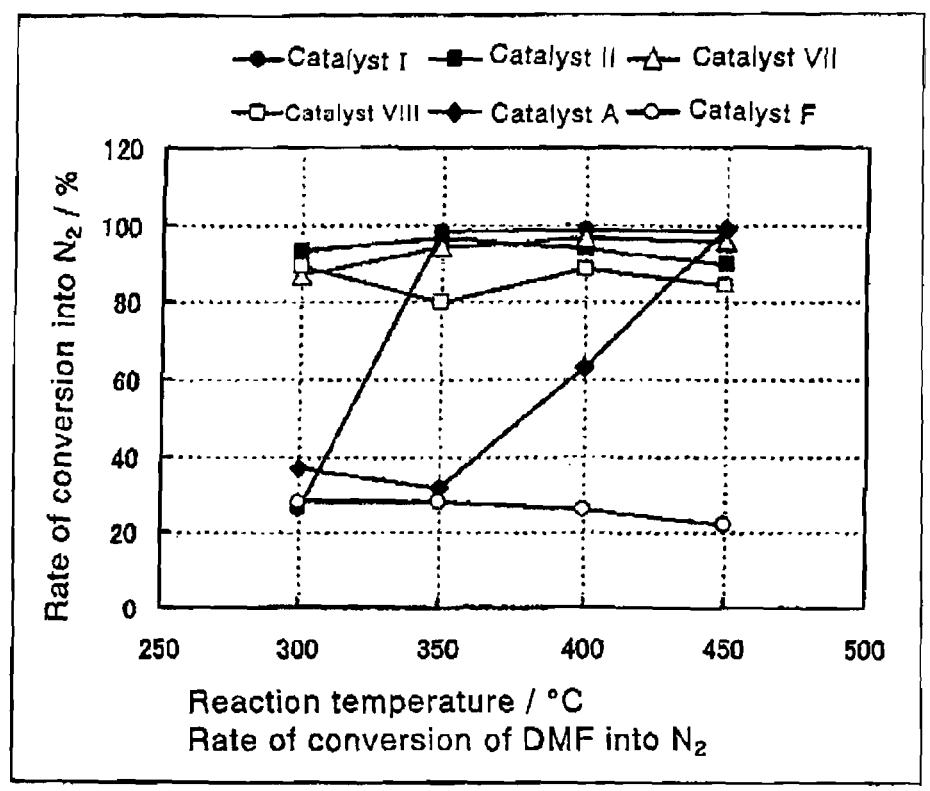
FIG. 1 shows the $N_2$ yields of Catalysts I, II, VII and VIII of the present invention and Catalysts A and F as Comparative Examples at reaction temperatures of 300 to 450° C.

The catalyst composition of the present invention contains a copper oxide and zeolite and, preferably, is formed by mixing copper oxide particles and zeolite particles. By using copper oxide particles rendered ready for use, it becomes possible to easily control the powder characteristics of the copper oxide particles, such as mean particle diameter and particle size distribution, thereby improving catalytic performance. In addition, a catalyst showing comparable or better performance can be produced by a simple method, as compared with a method in common use, such as the impregnation process or the coprecipitation process.

Herein, the copper oxide refers to an oxide containing copper, and includes a copper-containing compound oxide. For example, copper oxide represented by the compositional formula $CuO_x$ ($0.45 \leq x \leq 1.1$) is named, and typical examples are CuO and $Cu_2O$. Copper oxides of a plurality of compositions may be combined and used. A commercially available copper oxide can be used, and a mixture of oxides including a copper oxide may be used. For example, CuO in hopcalite may be used.

No limitations are imposed on the shape of the copper oxide particles used in the present invention, and a spherical shape, a semispherical shape, a cubic shape, and a scaly shape are included in the shape of these particles. The mean particle diameter of the copper oxide is 0.01 μm or more, preferably 0.05 μm or more, but 5 μm or less, from the point of view of catalytic performance. Unless otherwise specified, the mean particle diameter herein refers to the particle diameter of secondary particles. It is assumed that the mean particle diameter of the copper oxide particles is changed to control the state of contact of the copper oxide particles with the zeolite particles, thereby achieving a high $N_2$ selection rate, while suppressing the formation of undesirable components, such as $NO_x$, $M_2O$, HCN, $NH_3$, and CO, although any theory is non-binding.

There are no limitations on zeolite used in the present invention, and this zeolite may be a naturally occurring product or a synthetic product. Examples of the naturally occurring zeolite are mordenite, erionite, ferrierite and chabazite. Examples of the synthetic product are X-type zeolite; Y-type zeolite; MFI-type zeolite such, as ZSM-5; L-type zeolite; A-type zeolite; and β-type zeolite. Typical examples of the zeolite are HY-type zeolite available as LZY-84 of UOP, silicalite available as MFI-40 of UOP, βtype zeolite available as BETA-ZEOLITE zeolite of UOP, and mordenite available as LSM-8 of UOP. The use of mordenite. MFI-type and β-type zeolites among these zeolites and in which the molar ration between silica and alumina ($SiO_2/Al_2O_3$ molar ratio), the constituents of the zeolite, is 3 or higher, preferably 5 or higher, but 70 or lower, more preferably 5 to 50, particularly preferably 5 to 30 obtains a catalyst which results in the high decomposition rate of an organic nitrogen compound, involves little formation of $NO_x$, $N_2O$, $NH_3$ and CO, gives a high $N_2$ conversion rate.

The zeolite used in the present invention may be of a proton type, or of a substituted type to be described below.

A mixture of the proton-type zeolite and the substituted zeolite may be used as the zeolite. The proton-type zeolite refers to zeolite in which at least some of the ion-exchangeable cation sites are accounted for by $H^+$. For example, mordenite of the proton type is indicated as H-mordenite, the proton type of ZSM-5 as an example of the MFI-type zeolite is indicated as H-ZSH5. and the proton type of R-type zeolite is indicated as H-β zeolite. The proton-type zeolite, in which the molar ratio of the content of Na ions or K Ions introduced upon ion exchange (these alkali metal elements are expressed as M) relative to the $SiO_2$ content (the molar ratio as an oxide, i.e., $M_2O/SiO_2$) is 0 to 0.1, preferably 0 to 0.05, more preferably 0 to 0.03, is used particularly preferably as a catalyst component of the present invention for the purpose of an increase in the $N_2$ selection rate.

The substituted zeolite refers to zeolite in which at least some of the ion-exchangeable cation sites are accounted for by cations other than protons (i.e., substituting cations), for example, $NH_4^+$ or metallic cations. Hereinafter, the substituted zeolite, in which the substituting cations are metallic cations, is expressed as metal-substituted zeolite. Herein, the proton-type Y-type zeolite is expressed as HY-type zeolite, the Y-type zeolite in which Fe cations account for the cation sites is expressed as Fe—Y-type zeolite, and the Y-type zeolite in which $NH_4^+$ accounts for the cation sites is expressed as $NH_4$—Y-type zeolite. Other zeolites are also expressed similarly. Moreover, zeolites substituted by Fe cations are expressed collectively as Fe-zeolite. Likewise, zeolites substituted by Cu cations and Co cations are expressed collectively as Cu-zeolite and Co-zeolite, respectively.

No limitations are imposed on the substituting metal accounting for the ion-exchangeable cation sites of the metal-substituted zeolite. Examples of the substituting metal are Group 8 metals such as Fe; Group 9 metals such as Co and Rh; Group 10 metals such as Ni and Pd; and Group 11 elements such as Cu and Ag. The preferred substituting metals are Fe, Cu, Ni, Co and combinations of them.

In the present invention, the catalyst, which uses zeolite substituted by an alkali metal such as Na or K, or zeolite substituted by an alkaline earth metal such as Mg or Ca, among the metal-substituted zeolites, has a low $N_2$ conversion rate for the organic nitrogen compound, in comparison with zeolite substituted by a metal such as Fe, Cu, Co or Ni. Thus, the alkali metal—or the alkaline earth metal-substituted zeolite is preferably limited, as a metal oxide, to 1.0% by weight or less, preferably 0 to 0.5% by weight, more preferably 0 to 0.3% by weight, based on the catalyst composition.

Hence, zeolite substituted by Fe, Cu, Ni or Co is illustrated as the metal-substituted zeolite used preferably in the present invention. Such zeolites may be used singly or in combination. The amount of the substituting metal ions of Fe, Cu, Ni or Co is selected, as appropriate, depending on the $SiO_2/Al_2O_3$ molar ratio of the zeolite. Generally, the total amount of the substituting ions is in the range of 1 to 6 wt. % relative to the weight of the zeolite.

When the mean particle diameter of the copper oxide particles is in the range of 0.01 to 1 μm, the mean particle diameter of the zeolite particles used in the present invention is typically 1 μm or more, preferably 2 μm or more, but 50 nm or less, preferably 30 μm or less. The (mean particle diameter of the zeolite particles)/(mean particle diameter of the copper oxide particles) ratio is not limited. However, this ratio is typically 10 or higher, preferably 20 or higher, but 200 or lower, preferably 100 or lower. This mean particle diameter ratio is selected so as to promote contact between the zeolite particles and the copper oxide particles in the catalyst layer.

In the catalyst composition of the present invention, the weight of the copper oxide relative to the sum of the weights of the copper oxide and the zeolite is not limited, as long as the effects of the present invention are obtained. However, the proportion expressed as this weight is 0 μl wt. % or higher, preferably 0.5 wt. % or higher, more preferably 1.0 wt. % or higher, further preferably 2.0 wt. % or higher, but 40 wt. % or lower, preferably 30 wt. % or lower. If the proportion is less than the above-mentioned range, the activity of decomposing the organic nitrogen compound or ammonia, which is the purpose of the present invention, may be insufficient, or the conversion to $N_2$ as the object of the present invention may be insufficient. If the above range is exceeded, the formation of $NO_x$ is promoted, with the result that conversion to $N_2$ may be insufficient.

The catalyst composition of the present invention may contain one or more precious metals. Examples of the precious metal are Pt, Pd, Ru, Rh, Ir, an alloy of them, or a mixture of them.

There is no limitation on the form of the precious metal in the catalyst composition or the catalyst, and the precious metal may be carried on the copper oxide and/or zeolite. Alternatively, particles of the precious metal supported on neat-resistant inorganic oxide particles, such as silica, alumina, silica•alumina, or titania, may exist in a state mixed with zeolite particles.

Preferably, these heat-resistant inorganic oxide particles are spherical or semispherical, have a mean particle diameter of 1 to 30 μm, and have the above-mentioned precious metal carried thereon with a metal content in the range of 0.01 to 2.0% by weight.

The proportion of the weight of the precious metal in the catalyst composition of the present invention is 1 ppm or more, preferably 2 ppm or more, further preferably 5 ppm or more, but 1,000 ppm or less, preferably 500 ppm or less, further preferably 200 ppm or less, relative to the sum of the weights of the copper oxide and the zeolite.

The catalyst composition of the present invention containing the precious metal component in the above range is useful for converting an organic nitrogen compound and/or ammonia, contained in an exhaust gas, into $N_2$ at a high selection rate when placed at a temperature in the range of 250 to 600° C., preferably 300 to 500° C., more preferably 300 to 450° C., further preferably 300 to 400° C.; for preventing unburned carbonaceous components or high-boiling components, such as tar, from remaining on the catalyst; and for suppressing the formation, as by-products, of intermediate products (e.g., CO) derived from hydrocarbon components. Furthermore, the catalyst composition containing the precious metal component exhibits the effects, particularly, in suppressing the tendency toward increases in by-products, such as CO and $NH_3$, due to catalyst deterioration occurring during long-term use, and curtailing a decrease in the rate of conversion of the organic nitrogen compound and ammonia into $N_2$, namely, suppressing decline in activity, during treatment of an exhaust gas containing an acidic component such as $SO_2$ in an amount of the order of 1 to 200 ppm.

The addition of the precious metal to the catalyst composition ran be performed using various publicly known means. For example, after the copper oxide and zeolite are mixed, the precious metal may be carried thereon. In another mode, after the precious metal is carried on the copper oxide, the resulting composite may be mixed with zeolite particles. In still another mode, after the precious metal is carried on the zeolite, the resulting composite may be mixed with the copper oxide particles, in a still further mode, of the precious metal is carried on a material other than the copper oxide and zeolite, the resulting composite may be mixed with the copper oxide and zeolite. The material as the carrier of the precious metal may have or lack catalytic activity toward organic nitrogen compounds or ammonia, and is preferably heat resistant. Examples of such a material are silica, silica alumina, and titania. In particular, a catalyst composition in which silica or titania particles supporting Pt or Ru are mixed with copper oxide and zeolite particles is excellent, particularly, in the effect of decomposing organic nitrogen compounds nearly completely, and converting them into $N_2$ at a high rate.

The catalyst composition of the present invention, in another mode, may contain a manganese oxide. By adding the manganese oxide, it may be possible to suppress the formation of Co. If the catalyst composition of the present invention contains a manganese oxide, the weight of the manganese oxide relative to the sum of the weights of the copper oxide and zeolite is preferably 0.1 wt. % or more, but 10 wt. % or less. If this weight percentage is less than the above range, the effect of the manganese oxide may be difficult to detect. If the above range is exceeded, the formation of $N_x$ and $N_2O$ may be promoted. The manganese oxide refers to an oxide containing manganese, and also includes a manganese-containing compound oxide. The manganese oxide includes, for example, manganese oxide represented by the compositional formula $MnO_x$ ($0.9 \leq x \leq 2.1$). and its examples are MnO, $Mn_2O_2$, and $MnO_2$. A plurality of manganese oxides may be combined and used. No limitation is imposed on the average valence of the manganese oxide, but typically, the average valence is 2.5 or higher, preferably 2.9 or higher, but 4.1 or lower. The manganese oxide may be supplied in the form of a mixture with an oxide of other metal. For example, $MnO_2$ in hopcalite can be used as the manganese oxide.

The catalyst composition of the present invention consists essentially of the copper oxide and the zeolite. However, components other than them, for example, refractory inorganic oxides, such as alumina, silica, titania and zirconia, may be further contained, as long as they do not inhibit the desired catalytic action. On the other hand, the incorporation of an alkali metal oxide or an alkaline earth metal oxide, such as $Na_2O$, $K_2O$, CaO or MgO, decreases the decomposition rate of the organic nitrogen compound, and further becomes the cause of an increase in Co due to activity decline during long-term use. Thus, the incorporation of such a metal oxide, as an oxide, is preferably limited to 1.0% by weight or less, more preferably 0 to 0.5% by weight, further preferably 0 to 0.3% by weight.

The illustrative formulation of the catalyst composition of the present invention will be described below.

In an aspect of the present invention, the catalyst composition of the present invention contains a copper oxide and proton-type zeolite, and the weight of the copper oxide relative to the sum of the weights of the copper oxide and the proton-type zeolite is in the range of 2.0 to 20 wt. %.

In another aspect, the catalyst composition of the present invention contains a copper oxide, proton-type zeolite and a precious metal, the weight of the copper oxide relative to the sum of the weights of the copper oxide and the proton-type zeolite is in the range of 0.5 to 10 wt. %, and the sum of the weight of the precious metal is in the range of 2 to 500 ppm.

In another aspect, the catalyst composition of the present invention contains a copper oxide, proton-type zeolite having an $SiO_2/Al_3O_3$ molar ratio of 5 to 50, and a precious metal, the weight of the copper oxide relative to the sum of the weights of the copper oxide and the proton-type zeolite is in the range of 2 to 30 wt. %, and the sum of the weight of the precious metal is in the range of 2 to 500 ppm.

In another aspect, the catalyst composition of the present invention contains a copper oxide, proton-type zeolite having an $SiO_2/Al_2O_3$ molar ratio of 5 to 50 and being one or more of mordenitei, MFI zeolite, and β-type zeolite, and a precious metal, the weight of the copper oxide relative to the sum of the weights of the copper oxide and the proton-type zeolite is in the range of 2 to 30 wt. %, and the sum of the weight of the precious metal is in the range of 2 to 500 ppm.

In another aspect, the catalyst composition of the present invention contains a copper oxide, proton-type zeolite, and a precious metal, the weight of the copper oxide relative to the sum of the weights of the copper oxide and the proton-type zeolite is in the range of 1.0 to 10 wt. %, and the sum of the weight of the precious metal is in the range of 2 to 500 ppm. The precious metal is carried on silica particles, titania particles, alumina particles, or a mixture thereof, and these particles are mixed with copper oxide particles and proton-type zeolite particles.

In another aspect, the catalyst composition of the present invention contains a copper oxide, proton-type zeolite having an $SiO_2/Al_2O_3$ molar ratio of 5 to 50 and being one or more of mordenite, MFI zeolite, and β-type zeolite, and a precious metal, the weight of the copper oxide relative to the sum of the weights of the copper oxide and the proton-type zeolite is in the range of 1.0 to 30 wt. %, and the sum of the weight of the precious metal is in the range of 2 to 500 ppm. The precious metal is Pt or Ru, and is carried on silica particles, titania particles, alumina particles, or a mixture thereof, and these particles are mixed with copper oxide particles and proton-type zeolite particles.

In another aspect, the catalyst composition of the present invention contains a copper oxide, and meta-substituted zeolite substituted by one or more of Fe. Cu, Ni and Co, and the weight of the copper oxide relative to the sum of the weights of the copper oxide and the metal-substituted zeolite is in the range of 1-0 to 15 wt. %

In another aspect, the catalyst composition of the present invention contains a copper oxide, meta-substituted zeolite substituted by one or more of Fe, Cu, Ni and Co, and a precious metal, the weight of the copper oxide relative to the sum of the weights of the copper oxide and the metal-substituted zeolite is in the range of 1.0 to 10 wt. %, and the sum of the weight of the precious metal is in the range of 2 to 500 ppm. The precious metal is carried on silica particles, titania particles, alumina particles, or a mixture thereof, and these particles are mixed with copper oxide particles and proton-type zeolite particles.

In another aspect, the catalyst composition of the present invention contains a copper oxide, meta-substituted zoolite substituted by one or more of Fe, Cu, Ni and Co, and a precious metal, the weight of the copper oxide relative to the sum of the weights of the copper oxide and the metal-substituted zeolite is in the range of 1.0 to 30 wt. %, the $SiO_2/Al_2O_3$ molar ratio of the metal-substituted zeolite is 5 to 50, and the sum of the weight of the precious metal is in the range of 2 to 500 ppm. The precious metal is carried on silica particles, titania particles, alumina particles, or a mixture thereof, and these particles are mixed with copper oxide particles and metal-substituted zeolite particles.

In another aspect, the catalyst composition of the present invention contains a copper oxide, metal-substituted zeolite substituted by one or more of Fe, Cu, Ni and Co, and $MnO_2$ and, relative to the sum of the weights of the copper oxide and the metal-substituted zeolite, the weight of the copper oxide is in the range of 1.0 to 10 wt. % and the weight of the manganese oxide is in the range of 0.5 to 10 wt. %.

In another aspect, the catalyst composition of the present invention contains a copper oxide, meta-substituted zeolite substituted by one or more of Fe, Cu, Ni and Co, and $MnO_2$ and, relative to the sum of the weights of the copper oxide and the metal-substituted zeolite, the weight of the copper oxide is in the range of 1.0 to 10 wt. % and the weight of the manganese oxide is in the range of 0.5 to 10 wt. %. The copper oxide and the manganese oxide are components of hopcalite.

The catalyst composition of the present invention is produced by mixing copper oxide particles and zeolite particles. There is no limitation on means of mixing, and an arbitrary publicly known means, such as dry mixing or wet mixing, can be used. The use of dry mixing enables a powdery catalyst composition to be produced, while the use of wet mixing enables a slurry catalyst composition to be produced. During mixing, components other than the copper oxide and the zeolite may be mixed in combination, and after the copper oxide particles and the zeolite particles are mixed, the other components may be mixed. As the other components, a binder component, precious metal-carried silica particles, precious metal-carried titania particles, and precious metal-carried alumina particles are named. The mean particle diameter of these precious metal-carried particles is generally in the range of 0.5 to 20 μm. Various publicly known binders can be used as the binder, and their examples are colloidal silica, alumina sol, silicate sol, and boehmite. As noted here, the catalyst composition of the present invention may be in the form of a powder, pellets, or a slurry.

The present invention also relates to a catalyst having a catalyst layer formed on a catalyst substrate (may be called a structural body), the catalyst layer containing the above-described catalyst composition. A typical catalyst is of a form having the catalyst layer formed on the surface of the catalyst substrate with the use of the catalyst composition containing the copper oxide and the zeolite. In the catalyst layer, therefore, copper oxide particles and zeolite particles exist in a mixed state, the particles are fixed to each other by a suitable binder, and the particles and the substrate are fixed together by a suitable binder. The thickness of the catalyst layer is generally in the range of 10 to 1000 μm. No limitation is imposed on the shape of the catalyst substrate used, and the preferred shape is such that a differential pressure generated during gas passage is small, and that the area of contact with the gas is large. The preferred shapes include a honeycomb, corrugations, a foamed metal, a sheet, a mesh, a fiber, a pipe, and a filter. There is no limitation on the material for the substrate, and examples of the material are hopcalite, cordierite, alumina, silica alumina, a carbon fiber, a metal fiber, a glass fiber, a ceramic fiber, and a metal such as stainless steel. The material for the substrate preferably has excellent corrosion resistance and excellent heat resistance.

An illustrative method of producing the catalyst of the present invention will be described. First, a mixture of copper oxide particles and zeolite particles is formed. If the aforementioned catalyst composition is powdery this catalyst composition may be used as the mixture. Water and, in some cases, a binder are added to the mixture, and these materials are kneaded to form a slurry. If the aforementioned catalyst composition is in a slurry form, the catalyst composition may be used as the slurry for a subsequent step. The step of mixing the copper oxide particles and the zeolite particles, and the step of forming the mixture into the slurry may be performed sequentially, continuously or simultaneously. Where necessary, the manganese oxide and/or the precious metal may be added in the mixing step and/or the slurrying step. The resulting slurry is coated onto the catalyst substrate, and dried. No limitation is imposed on the coating method, and a publicly known method including wash coating or dipping can be used. If desired, these operations are repeated, whereby the thickness of the catalyst layer can be adjusted.

The present invention also relates to an exhaust gas purification apparatus using the above-described catalyst. The exhaust gas purification apparatus has an exhaust gas channel, and the interior of the channel is provided with a first catalyst region accommodating the catalyst of the present invention, and a second catalyst region accommodating a precious metal-carried catalyst. The second catalyst region (succeeding stage) is located downstream of the first catalyst region (preceding stage). In the channel, another catalyst region may be further installed. Various publicly known catalysts, for example, a platinum catalyst carried on alumina (expressed as $Pt/Al_2O_3$) can be used as the precious metal-carried catalyst accommodated in the second catalyst region. The precious metal-carried catalyst preferably has the ability to oxidize hydrocarbon. By installing the precious metal-carried catalyst in the succeeding stage, the unreacted hydrocarbon and/or Co flowing in from the preceding stage can be oxidized to prevent discharge of harmful components.

A region accommodating an adsorbent or a decomposing catalyst for capturing or decomposing a catalytic poison component in the exhaust gas may be further provided in the channel upstream of the region where the catalyst of the present invention is accommodated. In treating the exhaust gas containing organosilicon together with the organic nitrogen compound, for example, a catalyst containing a mixture of precious metal-carried alumina particles and zeolite particles (1:99 to 70:30; weight ratio) is provided upstream of the catalyst of the present invention, whereby the life of the catalyst of the present invention can be improved markedly.

Examples of the organic nitrogen compound which can be treated with the catalyst of the present invention are nitrites such as acetonitrile and acrylonitrile: amides such as formamide and dimethylformamide: amines such as methylamine, ethylamine, dimethylamine, diethylamine, trimethylamine, and triethylamine; proteins; amino acids; alkanolamines such as ethanolamine; heterocyclic compounds such as pyrrole, imidazole, pyrazole, pyridine, pyrazine, pyrimidine, pyridazine, and pyrrolidone; ammonium compounds such as quaternary ammonium compounds; and imide compounds or urethane compounds having uses as paint components or fiber components. The organic nitrogen compound refers to a compound containing at least one nitrogen atom in a molecule.

The exhaust gas containing the organic nitrogen compound and/or ammonia is generated in a manufacturing process for these compounds, various processes using these compounds as raw materials or solvents, and various processes where these compounds are by-products. For example, the exhaust gas occurs in the roasting of coffee; waste water treatment; treatment and processing of plants or animals; food processing: production of synthetic fibers, synthetic rubbers or synthetic resins having nitrile as a polymeric unit; a coating process using a paint containing the organic nitrogen compound as a solvent or a paint component; and a painting process (e.g., an electrodeposition process) or a baking process for polyimide or an acrylic paint. In any of the exhaust gases, an organic solvent, other organic compound, or a heat decomposition product exists normally in addition to the organic nitrogen compound. In the exhaust gas generated from roasted coffee, for example, organic compounds, such as cellulose, hemicellulose, fatty acids, and caffeine, are incorporated in addition to organic nitrogen compounds such as proteins, amino acid, or their heat-denaturation components. The catalyst of the present invention can be used in the treatment of the exhaust gas containing these organic nitrogen compounds and/or ammonia and other organic compound components.

The catalyst of the present invention shows a high decomposition rate and high $N_2$ selectivity for the organic nitrogen compound and/or ammonia not only at a low space velocity (e.g., SV of 3,000 $hr^{-1}$: SV denotes the ratio of the volume of the gas passed to the volume of the catalyst per unit time), but also at a high space velocity (e.g., SV=50,000 to 100,000 $hr^{-1}$), and can decrease the formation of undesirable by-products such as NO, $NO_2$, $NH_3$, HCN, and nitrogen-containing intermediates (e.g., amine, imine, and imide) and CO. In the case of the honeycomb-shaped catalyst. SV refers to the ratio of the volume of the exhaust gas passed per hour to the volume of the honeycomb body including its space portions. In the case of the catalyst layer packed with a particulate catalyst such as an extrudate, SV refers to the ratio of the volume of the exhaust gas passed per hour to the volume of the packed layer.

In the exhaust gas treated with the catalyst of the present invention, oxygen in an amount at least necessary for an oxidation reaction is preferably contained, since organic components in the exhaust gas are to be oxidized and removed as $CO_2$.

When the catalyst of the present invention is brought into contact with the exhaust gas, which contains 1 to 1.000 ppm by weight of the organic nitrogen compound and/or ammonia as a nitrogen content, at a temperature of 250° C. or higher, preferably 300° C. or higher, more preferably 300° C. or higher, but 600° C. or lower, preferably 500° C. or lower, more preferably 450° C. or lower, further preferably 300 to 400° C., these components are efficiently decomposed, and a high $N_2$ selection rate is obtained.

EXAMPLES

The present invention will be described in more detail based on the Examples, which in no way limit the invention.

Preparation of $NH_4$-mordenita ($NH_4$—SCM5)

Na-type mordenite (SCM-5 produced by UOP, $SiO_2$/$Al_2O_3$ molar ratio 10.7, mean particle diameter 5.6 μm) (600 g), 300 g of ammonium chloride, and 2.300 g of deionized water were mixed, and stirred for 3 hours at 80° C. Then, the mixture was filtered by suction, and washed twice with 2 liters of water each. Then, the filter cake recovered was dried for 5 hours at 150° by a dryer to obtain $NH_4$-mordenite ($NH_4$—SCM5).

[Preparation of Metal-Substituted Zeolite]

Preparation of Fe-Mordenite

Ferric chloride tetrahydrate (42.7 g) was dissolved in 1,557 g of deionized water, and 404 g of $NH_4$-mordenite (the above-mentioned $NH_4$—SCM5) was further added. To the resulting mixture, a 28% aqueous solution of ammonia was added, with stirring and with pH being, measured, until a pH of 8.0 was reached. After stirring was continued, the mixture was filtered by suction. A solid filtered off was washed with deionized water, and then dried for 5 hours at 150° C. The solid was further calcined for 2 hours at 500° C. in an air stream in a muffle furnace to obtain Fe-mordenite.

Preparation of Cu-Mordenite

Copper nitrate trihydrate (1.4 g) was dissolved in 389 g of deionized water, and a 28% aqueous solution of ammonia was added to adjust the pH to 10.5-11. To the resulting mixture. 101 g of $NH_4$-mordenite (the above-mentioned $NH_4$—SCM5) was added. After stirring, the mixture was filtered by suction. A solid filtered off was washed with deionized water, and then dried for 5 hours at 150° C. The solid was further calcined for 2 hours at 500° C. in an air stream in a muffle furnace to obtain Cu-mordenite.

Preparation of Cu-ZSM5

Copper acetate (4.0 g) was dissolved in 500 cc of water, and the solution was held at 80° C. To the solution, 29 g of $NH_4$-MFI-40 (zeolite produced by UOP, $SiO_2$/$Al_2O_3$ molar ratio 40) was added, and the mixture was stirred for 3 hours. After filtration and washing were performed, the filter cake recovered was dried for 3 hours at 15000. A powder filtered was ion-exchanged again by the same method using the same solution as described above. After two ion-exchanges, the powder was calcined for 4 hours at 500° C. to prepare Cu-ZSM5.

[Production of Catalyst]

EXAMPLES

Catalyst I

The aforementioned $NH_4$—SCM5 powder (25 g) and 0.56 g of a CuO powder (produced by Chemilite Corp., mean particle diameter 0.52 μm) were mixed in a mortar to become uniform. To the resulting mixture, 28 g of alumina sol as a binder and 26 g of deionized water were added, and these materials were thoroughly kneaded to obtain a slurry. The slurry was wash-coated onto a ceramic corrugated honeycomb substrate (produced by NICHIAS CORP., diameter 21 ϕ×length 50 mm, cell count: 200 cells/square inch). The coated substrate was dried for 2 hours at 150° C. by a dryer, and further calcined for 1 hour at 500° C. in an air stream in a muffle furnace to obtain Catalyst I.

The proportion of CuO in Catalyst I, represented by the following equation $$(\text{weight of CuO})/(\text{weight of CuO}+\text{weight of zeolite})\times 100(\%)$$

(unless otherwise indicated, the proportion of each component will hereinafter be expressed as the proportion to the sum of (weight of CuO+weight of zeolite), was 2.2 wt. %.

Catalysts II and III

Catalysts II and III were produced in the same manner as for Catalyst I, except that the amounts of the $NH_4$—SCM5 powder and the CuO powder mentioned above were selected such that the proportion of CuO would become 6.9 wt. % (Catalyst II) and 12.3 wt. % (Catalyst III).

Catalyst IV

Catalyst IV was produced In the same manner as for Catalyst I, except that 25.2 g of an Fe-mordenite powder (mean particle diameter 4.2 μm) was used Instead of the $NH_4$—SCM5 and the amount of the CuO powder was set at 0.52 g. The proportion of CuO in Catalyst IV was 2.2 wt. %.

Catalyst V

Catalyst V was produced in the same manner as for Catalyst IV, except that 0.19 g of a hopcalite powder was used instead of the CuO powder and the amount of the Fe-mordenite was set at 25.5 g. The proportion of CuO in Catalyst V was 0.2 wt. %. The hopcalite used was a product of SÜD-CHEMIE, its composition was as shown below, and its mean particle diameter was 7.3 μm.

$MnO_2$: 72.6 wt. %; CuO: 21.1 wt. %; $K_2O$: 3.7 wt. %

Catalyst VI

Catalyst VI was produced in the same manner as for Catalyst V, except that the amount of the hopcalite powder was set at 0.56 g and 25.2 g of Cu-mordenite was used instead of 25.5 g of the Fe-mordenite. The proportion of CuO in Catalyst VI was 0.5 wt. %.

Catalyst VII

Catalyst VII was produced in the same manner as for Catalyst V, except that the amounts of the Cu-zeolite and the hopcalite were selected such that the proportion of CuO would become 0.8 wt. %.

Catalyst VIII

A slurry was prepared using 487 g of the aforementioned $NH_4$—SCM5, 10.5 g of a CuO powder, 17.5 g of a Pt-carried $SiO_2$ powder (the amount of Pt carried; 0.04 wt. %), 525 g of alumina sol, and 460 g of deionized water. Using this slurry, Catalyst VIII was produced in the same manner as for Catalyst I.

Catalyst IX

Catalyst IX was produced in the same manner as for Catalyst I, except that H-ZSM5 (H-MHFI40 produced by UOP, $SiO_2/Al_2O_3$ molar ratio 40 (a product comparable to H-ZSM5), mean particle diameter 2.8 μm) was used instead of the $NH_4$—SCM5, silica sol was used instead of the alumina sol, and the weights of the H-ZSM5 and CuO were selected such that the proportion of CuO in the catalyst would become 6.0 wt. %.

Catalyst X

Catalyst X was produced in the same manner as for Catalyst V, with the amounts of a CuO powder, a manganese oxide powder (produced by Carus Chemical company) and the aforementioned $NH_4$—SCM5 being selected such that the proportion of CuO would become 6.3 wt. % and the proportion of manganese oxide would become 0.7 wt. %.

Catalyst XI

Catalyst XI was produced in the same manner as for Catalyst V, except that the amounts of the aforementioned Fe-zeolite and the aforementioned hopcalite were selected such that the proportion of CuO would become 1.7 wt. %, and that 32 g of silica sol was used instead of the alumina sol as a binder.

Catalyst XII

A slurry was prepared using 105 g of the aforementioned $NH_4$—SCM5, 14.0 g of a CuO powder. 35 g of a Pt-carried $TiO_2$ powder (the amount of Pt carried: 0.04 wt. %), 105 g of alumina sol, and 240 g of deionized water. Using this slurry, Catalyst XII was produced in the same manner as for Catalyst I.

Catalyst XIII

Catalyst XIII was produced in the same manner as for Catalyst I, except that the amounts of a CuO powder and proton-type zeolite were selected such that the proportion of CuO would be 24 wt. %, and the proportion of H-type mordenite having a $SiO_2/Al_2O_3$ molar ratio of 18 (LZM8 produced by UOP) would be 76 wt. %.

Catalyst XIV

Catalyst XIV was produced in the same manner as for Catalyst I, except that the amounts of a CuO powder and proton-type zeolite were selected such that the proportion of CuO would be 13 wt. %, and the proportion of the same H-type mordenite (LZM8 produced by UOP) as that used for Catalyst XIII would be 87 wt. %.

Catalyst XV

Catalyst XV was produced in the same manner as for Catalyst XIV, except that a CuO powder and the aforementioned H-type mordenite (LZM8 produced by UOP) were used in the same proportions as for Catalyst XIV, and a Pt-carried $TiO_2$ powder (the amount of Pt carried: 0.04 wt. %) was further added.

Catalyst XVI

Catalyst XVI was produced in the same manner as for Catalyst XV, except that a Pt-carried $SiO_2$ powder (the amount of Pt carried: 0.04 wt. %) was used instead of the Pt-carried $TiO_2$ powder.

Catalyst XVII

Catalyst XVII was produced in the same manner as for Catalyst XV, except that a CuO powder and the aforementioned H-type mordenite (LZM8 produced by UOP) were used in the same proportions, and a Pt-carried $Al_2O_3$ powder (the amount of Pt carried: 0.04 wt. %) was further added.

Catalyst XVIII

Catalyst XVII was produced in the same manner as for Catalyst XV, except that β-type zeolite having a $SiO_2/Al_2O_3$ molar ratio of 25 (Zeolite β produced by UOP) was used instead of the H-type mordenite of Catalyst XV.

Catalyst XIX

Catalyst XIX was produced in the same manner as for Catalyst XV, except that MFI-type zeolite having a $SiO_2/Al_2O_3$ molar ratio of 30 (CBV-3020 produced by Zeolist) was used instead of the H-type mordenite of Catalyst XV.

Catalyst XX

Catalyst XIX was produced in the same manner as for Catalyst XV, except that MFI-type zeolite having a $SiO_2/Al_2O_3$ molar ratio of 50 (CBV-5524 produced by Zeolist) was used instead of the H-type mordenite of Catalyst XV.

The compositions of Catalysts I to XX are shown in Table 1 below. The proportion of each component is expressed as wt. % to the sum of the weights of CuO and zeolite.

[Table 1]

TABLE 1

Table 1 Catalyst compositions (Examples)

| Catalyst | Weight of CuO | Type (upper) and weight (lower) of zeolite | $SiO_2/Al_2O_3$ ratio (mole) of zeolite | Type (upper) and weight (lower) of active component other than CuO and zeolite |
|---|---|---|---|---|
| I | 2.2 | H-mordenite 97.8 | 10.7 | — |
| II | 6.9 | H-mordenite 93.1 | 10.7 | — |
| III | 12.3 | H-mordenite 87.7 | 10.7 | — |
| IV | 2.2 | Fe-mordenite 97.8 | 10.7 | — |
| V | 0.2 | Fe-mordenite 99.8 | 10.7 | $MnO_2$ 0.5 |
| VI | 0.5 | Cu-mordenite 99.5 | 10.7 | $MnO_2$ 1.6 |
| VII | 0.8 | Fe-mordenite 99.2 | 10.7 | $MnO_2$ 2.7 |
| VIII | 2.2 | H-mordenite 97.8 | 10.7 | $Pt/SiO_2$ 0.01 |
| IX | 6.0 | H-ZSM5 94.0 | 40.0 | — |
| X | 6.3 | H-mordenite 93.7 | 10.7 | $MnO_2$ 0.7 |
| XI | 1.7 | Fe-mordenite 98.3 | 10.7 | $MnO_2$ 6.0 |
| XII | 11.7 | H-mordenite 88.3 | 10.7 | $Pt/TiO_2$ 0.014 |
| XIII | 24.0 | H-mordenite 76.0 | 18 | — |
| XIV | 13.0 | H-mordenite 87.0 | 18 | — |
| XV | 13.0 | H-mordenite 87.0 | 18 | $Pt/TiO_2$ 0.014 |

TABLE 1-continued

Table 1 Catalyst compositions (Examples)

| Catalyst | Weight of CuO | Type (upper) and weight (lower) of zeolite | SiO$_2$/Al$_2$O$_3$ ratio (mole) of zeolite | Type (upper) and weight (lower) of active component other than CuO and zeolite |
|---|---|---|---|---|
| XVI | 13.0 | H-mordenite 87.0 | 18 | Pt/SiO$_2$ 0.014 |
| XVII | 13.0 | H-mordenite 87.0 | 18 | Pd/Al$_2$O$_3$ 0.014 |
| XVIII | 13.0 | H-β zeolite 87.0 | 25 | Pt/TiO$_2$ 0.014 |
| XIX | 13.0 | H-ZSM 87.0 | 30 | Pt/TiO$_2$ 0.014 |
| XX | 13.0 | H-ZSM 87.0 | 50 | Pt/TiO$_2$ 0.014 |

*The weight of each component was expressed as a proportion (%) to the sum of the weights of CuO and zeolite.
**MnO$_2$ in Catalysts V to VII and XI is present as a component of hopcalite.

Comparative Examples

Catalyst A

Catalyst A was produced in the same manner as for Catalyst IV, except that CuO was all replaced by Fe-mordenite.

Catalyst B

Catalyst B was produced in the same manner as for Catalyst V, except that Fe-mordenite was all replaced by hopcalite.

Catalyst C

Catalyst C was produced in the same manner as for Catalyst V with the use of a mixed slurry consisting of 25.6 g of a pulverization product of a commercially available denitration catalyst (produced by Catalyst & Chemicals Industries), 2.1 g of hopcalite, 32 g of silica sol, and 20 g of water.

Catalyst D

A slurry was prepared using 1.3 g of a MnO$_2$ powder, 25 g of NH$_4$—SCM5, 28 g of alumina sol, and 26 g of water. Using this slurry, Catalyst D was produced in the same manner as for Catalyst I.

Catalyst E

Catalyst E was produced in the same manner as for Catalyst A, except that Fe-mordenite was all replaced by Cu-ZSM5.

Catalyst F

Catalyst F was produced in the same manner as for Catalyst D, except that a Pt-carried alumina catalyst was used instead of Cu-mordenite.

Catalyst G

Catalyst G was produced in the same manner as for Catalyst XV, except that H-type mordenite having a SiO$_2$/Al$_2$O$_3$ molar ratio of 240 (HSZ-690HOA produced by TOSOH CORP.) was used instead of the H-type mordenite of Catalyst XV.

Catalyst H

Catalyst H was produced in the same manner as for Catalyst XV, except that Na-type mordenite having a SiO$_2$/Al$_2$O$_3$ molar ratio of 18 (HSZ-642NAA produced by TOSOH CORP.) was used instead of the H-type mordenite of Catalyst XV.

Catalyst I

Copper nitrate (20.0 g) and 14.0 g of magnesium nitrate were dissolved in 100 g of deionized water. An H-ZSM5 zeolite (H-MFI40 produced by UOP, SiO$_2$/Al$_2$O$_3$ molar ratio 40) powder (61 g) and 22.6 g of a β-type zeolite (CBV-3020 produced by Zeolist, SiO$_2$/Al$_2$O$_3$ molar ratio 30) powder were charged into the solution. After thorough stirring, the mixture was dried for 10 hours at 1200 in a dryer. The resulting powder was further pulverized in an agate mortar, and the powder obtained was calcined for 2 hours at 500° C. in air to obtain a zeolite powder containing CuO and MgO. The resulting powder (21.6 g) and 25.9 g of a silica binder were charged into 31 g of deionized water to prepare a slurry. The slurry was wash-coated onto the same corrugated honeycomb as used in the production of Catalyst I, and the coated honeycomb was dried for 2 hours at 150° C. Then, the honeycomb was calcined for 1 hour at 500° C. in air to obtain Catalyst I.

The composition of the resulting catalyst carried on the honeycomb (catalyst I) per liter was as follows:

CuO: 6.3 g; MgO: 2.1 g; zeolite 80.4 g (breakdown: H-ZSM5; 63.5 g, 0:16.9 g); CuO:zeolite (weight ratio)=7.3: 92.7; MgO content (wt. % to the sum of CuO and zeolite): 2.4%.

The compositions of Catalysts A to I are shown in table 2.
[Table 2]

TABLE 2

Table 2 Catalyst compositions (Comparative Examples)

| Catalyst | Weight of CuO | Type (upper) and weight (lower) of zeolite | SiO$_2$/Al$_2$O$_3$ ratio (mole) of zeolite | Type (upper) and weight (lower) of active component other than CuO and zeolite |
|---|---|---|---|---|
| A | — | Fe-mordenite 100 | 10.7 | — |
| B | 100 | — | — | MnO$_2$ 346 |
| C | 100 | — | — | WO$_x$, VO$_x$, MnO$_2$ |
| D | — | H-mordenite 100 | 10.7 | MnO$_2$ 5.2 |
| E | — | Cu-ZSM5 100 | 40 | — |
| F | — | — | — | Pt/Al$_2$O$_3$ |
| G | 13 | H-mordenite 87 | 240 | Pt/TiO$_2$ |
| H | 13 | Na-mordenite 87 | 18 | Pt/TiO$_2$ |

TABLE 2-continued

Table 2 Catalyst compositions (Comparative Examples)

| Catalyst | Weight of CuO | Type (upper) and weight (lower) of zeolite | $SiO_2/Al_2O_3$ ratio (mole) of zeolite | Type (upper) and weight (lower) of active component other than CuO and zeolite |
|---|---|---|---|---|
| I | 7.3 | H-ZSM5 + β zeolite 92.7 | about 35 | MgO 2.4 |

\*In Catalysts A to C, the weight of each component was expressed as a proportion (%) to the sum of the weights of CuO and zeolite.
In Catalysts D and E, only Cu-ZSM5 and Pt/Al$_2$O$_3$, respectively, were used as the active component.
\*\*MnO$_2$ in Catalysts B and C is present as a component of hopcalite.

Evaluation Example 1

A gas containing dimethylformamide was passed through each of the above-mentioned honeycomb-shaped catalysts to evaluate catalytic activity. The composition of the gas used is as follows:

| | |
|---|---|
| Dimethylformamide (DMF) | 3000 ppm |
| O$_2$ | 10 mol % |
| Water | 1 mol % |
| Nitrogen | Remainder |

SV was set at 10,000 hr$^{-1}$, and the reaction temperatures were set at 300° C., 350° C., 400° C. and 450° C.

Detailed measuring conditions are as follows: First, a reactor was packed with the catalyst, and heated to a predetermined temperature while N$_2$ was being flowed. The flow rate of each component of the gas was adjusted to make a predetermined gas composition, whereafter measurement was started. Sampling was performed at the inlet and the outlet of the reactor. Assays of various components were made using the following methods:

NO and NO$_2$: Chemiluminescence

CO: Controlled-potential electrolysis

NH$_3$, CO$_2$ and N$_2$O: Gas chromatography (TCD)

DMF, other products: Gas chromatography (FID)

The decomposition rate of DMF, the conversion rate of DMF converted into N$_2$, and the yield of each product were determined by the following equations. Unless otherwise indicated, the decomposition rate, the survival rate, the yield, and the selection rate were expressed as mol %.

$$DMF \text{ decomposition rate } (\%) = \left(1 - \frac{\text{outlet } DMF \text{ concentration}}{\text{inlet } DMF \text{ concentration}}\right) \times 100 \quad \text{[Equation 1]}$$

$$DMF \text{ survival rate } (\%) = \frac{\text{outlet } DMF \text{ concentration}}{\text{inlet } DMF \text{ concentration}} \times 100 \quad \text{[Equation 2]}$$

$$CO \text{ yield } (\%) = \frac{\text{outlet CO concentration}}{\text{inlet } DMF \text{ concentration} \times 3} \times 100 \quad \text{[Equation 3]}$$

$$CO_2 \text{ yield } (\%) = \frac{\text{outlet } CO_2 \text{ concentration}}{\text{inlet } DMF \text{ concentration} \times 3} \times 100 \quad \text{[Equation 4]}$$

$$NH_3 \text{ yield } (\%) = \frac{\text{outlet } NH_3 \text{ concentration}}{\text{inlet } DMF \text{ concentration}} \times 100 \quad \text{[Equation 5]}$$

$$NO \text{ yield } (\%) = \frac{\text{outlet NO concentration}}{\text{inlet } DMF \text{ concentration}} \times 100 \quad \text{[Equation 6]}$$

$$NO_2 \text{ yield } (\%) = \frac{\text{outlet } NO_2 \text{ concentration}}{\text{inlet } DMF \text{ concentration}} \times 100 \quad \text{[Equation 7]}$$

$$NO_x \text{ yield } (\%) = NO \text{ yield} + NO_2 \text{ yield} \quad \text{[Equation 8]}$$

$$N_2O \text{ yield } (\%) = \frac{\text{outlet } N_2O \text{ concentration} \times 2}{\text{inlet } DMF \text{ concentration}} \times 100 \quad \text{[Equation 9]}$$

The amounts of nitrogen-containing organic compounds formed (expressed as "other N-containing components"), which were contained in the gas after passage through the reactor and which were other than NH$_3$, NO$_x$ and N$_2$O, were calculated by the following method: First, a Pt catalyst was further installed at the outlet of the catalyst to convert remaining DMF, generated NH$_3$, and "other N-containing components", which were contained in the gas after passage through the catalyst of the present invention, into N$_2$, NO$_x$ and N$_2$O. The gas after passage through this Pt catalyst was analyzed by the above-described methods to determine the NO$_x$ yield and the N$_2$O yield. These yields will be described hereinafter as NO$_x$ yield (Pt) and N$_2$O yield (Pt). Not only NO$_x$ and, N$_2$O formed by the catalyst of the present invention, but also NO$_x$ and N$_2$O derived from DMF, NH$_3$ and "other N-containing components" by the Pt catalyst contribute to NO$_x$ yield (Pt) and N$_2$O yield (Pt).

NO$_x$yield (Pt)+N$_2$O yield(Pt)(%)=(NO$_x$yield+N$_2$O yield)+(yield of NO$_x$ formed by Pt catalyst+yield of N$_2$O formed by Pt catalyst)   Equation 10

It was assumed that 80% of nitrogen of DMF, Ned and "other N-containing components" was converted to NO$_x$ and N$_2$O by the Pt catalyst, and 20% of the nitrogen was converted to N$_2$.

Yield of NO$_x$ formed by Pt catalyst+yield of N$_2$O formed by Pt catalyst (%)=(DMF survival rate+ NH$_3$ yield+yield of other N-containing components)×0.8   [Equation 11]

The yield of other N-containing components was calculated from the following equation based on the above two equations:

$$\text{Yield of other N-containing components (\%)} = \{(NO_x \text{ yield (Pt)} + N_2O \text{ yield(Pt)}) - (NO_x \text{ yield} + N_2O \text{ yield})\}/0.8 - (\text{DMF survival rate} + NH_3 \text{ yield}) \quad \text{[Equation 12]}$$

The $N_2$ yield was determined by the following equation:

$$N_2 \text{ yield(\%)} = 100 - (NO_x\text{yield} + N_2O + \text{yield} + NH_3\text{yield} + \text{DMF survival rate} + \text{yield of other N-containing components}) \quad \text{[Equation 13]}$$

The results of evaluation are shown in Tables 3 and 4 below. In connection with Catalysts I, II, VII and VIII of the present invention, and Catalysts A and F as Comparative Examples, the $N_2$ yields at the reaction temperatures of 300 to 450° C. are shown in FIG. 1.

[Table 3]

TABLE 3

Yields of nitrogen-based products in catalytic reaction of DMF-containing gas (reaction temperature 350° C.)

| Catalyst | $N_2$ | $NO_x$ | $N_2O$ | $NH_3$ | Other N-containing components |
|---|---|---|---|---|---|
| I | 98.3 | 0.7 | 0.7 | 0.3 | 0.0 |
| II | 96.8 | 0.5 | 2.7 | 0.0 | 0.0 |
| III | 94.9 | 0.7 | 4.4 | 0.0 | 0.0 |
| IV | 99.2 | 0.0 | 0.0 | 0.3 | 0.5 |
| V | 84.9 | 1.0 | 4.4 | 9.3 | 0.4 |
| VI | 89.0 | 0.2 | 10.8 | 0.0 | 0.0 |
| VII | 94.4 | 0.0 | 5.6 | 0.0 | 0.0 |
| VIII | 79.6 | 11.6 | 8.7 | 0.1 | 0.0 |
| IX | 97.7 | 0.6 | 1.6 | 0.1 | 0.0 |
| X | 93.0 | 1.8 | 5.2 | 0.0 | 0.0 |
| XI | 91.4 | 2.2 | 6.4 | 0.0 | 0.0 |
| XII | 94.9 | 0.1 | 5.0 | 0.0 | 0.0 |
| XIII | 94.9 | 0.7 | 4.4 | 0.0 | 0.0 |
| XIV | 95.3 | 0.2 | 4.5 | 0.0 | 0.0 |
| XV | 94.7 | 0.2 | 5.1 | 0.0 | 0.0 |
| XVI | 91.8 | 0.7 | 7.5 | 0.0 | 0.0 |
| XVII | 81.5 | 15.4 | 3.1 | 0.0 | 0.0 |
| XVIII | 92.4 | 0.1 | 7.1 | 0.0 | 0.4 |
| XIX | 95.4 | 0.5 | 4.1 | 0.0 | 0.0 |
| XX | 94.2 | 1.0 | 4.8 | 0.0 | 0.0 |
| A | 31.7 | 0.4 | 0.0 | 32.8 | 35.1 |
| B | 58.3 | 15.1 | 26.6 | 0.0 | 0.0 |
| C | 79.4 | 3.5 | 9.8 | 7.3 | 0.0 |
| D | 78.1 | 10.4 | 11.5 | 0.0 | 0.0 |
| E | 49.7 | 2.4 | 1.3 | 10.6 | 34.8 |
| F | 28.0 | 39.0 | 33.0 | 0.0 | 0.0 |
| G | 69.1 | 22.8 | 8.1 | 0.0 | 0.0 |
| H | 63.1 | 29.0 | 7.9 | 0.0 | 0.0 |
| I | 74.3 | 3.9 | 3.2 | 13.5 | 4.1 |

Note 1:
The DMF decomposition rate of Catalysts A to H was 100%.
Note 2:
The DMF decomposition rate of Catalyst I was 99%.

[Table 4]

TABLE 4

Yields of nitrogen-based products in catalytic reaction of DMF-containing gas (reaction temperature 400° C.)

| Catalyst | $N_2$ | $NO_x$ | $N_2O$ | $NH_3$ | Other N-containing components |
|---|---|---|---|---|---|
| I | 98.5 | 0.4 | 1.1 | 0.0 | 0.0 |
| II | 93.7 | 1.3 | 5.0 | 0.0 | 0.0 |
| III | 88.6 | 3.9 | 7.5 | 0.0 | 0.0 |
| IV | 100.0 | 0.0 | 0.0 | 0.0 | 0.0 |
| V | 99.8 | 0.1 | 0.0 | 0.1 | 0.0 |
| VI | 90.4 | 0.4 | 9.2 | 0.0 | 0.0 |
| VII | 96.7 | 1.3 | 2.0 | 0.0 | 0.0 |
| VIII | 88.7 | 0.4 | 1.9 | 0.0 | 0.0 |
| IX | 96.0 | 0.8 | 3.2 | 0.0 | 0.0 |
| X | 93.3 | 0.3 | 6.4 | 0.0 | 0.0 |
| XI | 93.7 | 3.3 | 3.0 | 0.0 | 0.0 |
| XII | 90.9 | 1.6 | 7.5 | 0.0 | 0.0 |
| XIII | 88.6 | 3.9 | 7.5 | 0.0 | 0.0 |
| XIV | 90.5 | 2.0 | 7.5 | 0.0 | 0.0 |
| XV | 89.6 | 2.6 | 7.8 | 0.0 | 0.0 |
| XVI | 88.9 | 3.0 | 8.1 | 0.0 | 0.0 |
| XVII | 78.4 | 19.4 | 2.2 | 0.0 | 0.0 |
| XVIII | 88.8 | 1.2 | 10.0 | 0.0 | 0.0 |
| XIX | 94.7 | 1.4 | 3.9 | 0.0 | 0.0 |
| XX | 91.0 | 4.2 | 4.8 | 0.0 | 0.0 |
| A | 63.1 | 0.2 | 0.0 | 36.7 | 0.0 |
| B | 44.4 | 26.5 | 29.1 | 0.0 | 0.0 |
| C | 72.3 | 10.8 | 12.7 | 0.3 | 3.9 |
| D | 66.1 | 22.9 | 11.0 | 0.0 | 0.0 |
| E | 99.2 | 0.7 | 0.0 | 0.1 | 0.0 |
| F | 26.0 | 55.0 | 19.0 | 0.0 | 0.0 |
| G | 62.2 | 29.5 | 8.3 | 0.0 | 0.0 |
| H | 58.8 | 33.7 | 7.5 | 0.0 | 0.0 |
| I | 95.5 | 1.3 | 2.7 | 0.0 | 0.5 |

Note 1:
The DMF decomposition rate of all catalysts was 100%.

As shown in Table 3, Table 4 and FIG. 1, the catalysts of the present invention containing copper oxide and zeolite are demonstrated to be catalysts which decompose DMF at a rate of nearly 100%, suppress the formation of $NH_3$, $NO_x$, $N_2O$, other r-containing components, and CO, and achieve a high rate of conversion into $N_2$, at 350° C. to 450° C. With Catalysts I to IV, VII, IX to XI, for example, the rates of conversion into $N_2$ are 90% or higher.

In comparison, the catalysts free from copper oxide and containing zeolite alone (Catalysts A and D) form large amounts of $NH_3$ or N-containing components at 350° C., showing extremely low $N_2$ selectivity. The copper oxide-based catalysts (Catalysts B and C) and the precious metal-based catalyst (Catalyst F), both free from zeolite, have high selection rates of $NO_x$ and/or $N_2O$, and show low $N_2$ selectivity. The catalyst I as the Comparative Example, containing MgO, forms a large amount of $NH_3$ at 350° C., showing a low $N_2$ yield.

Thus, the catalysts of the present invention can be said to show excellent performance in treating a nitrogen-based exhaust gas.

Figure 2:
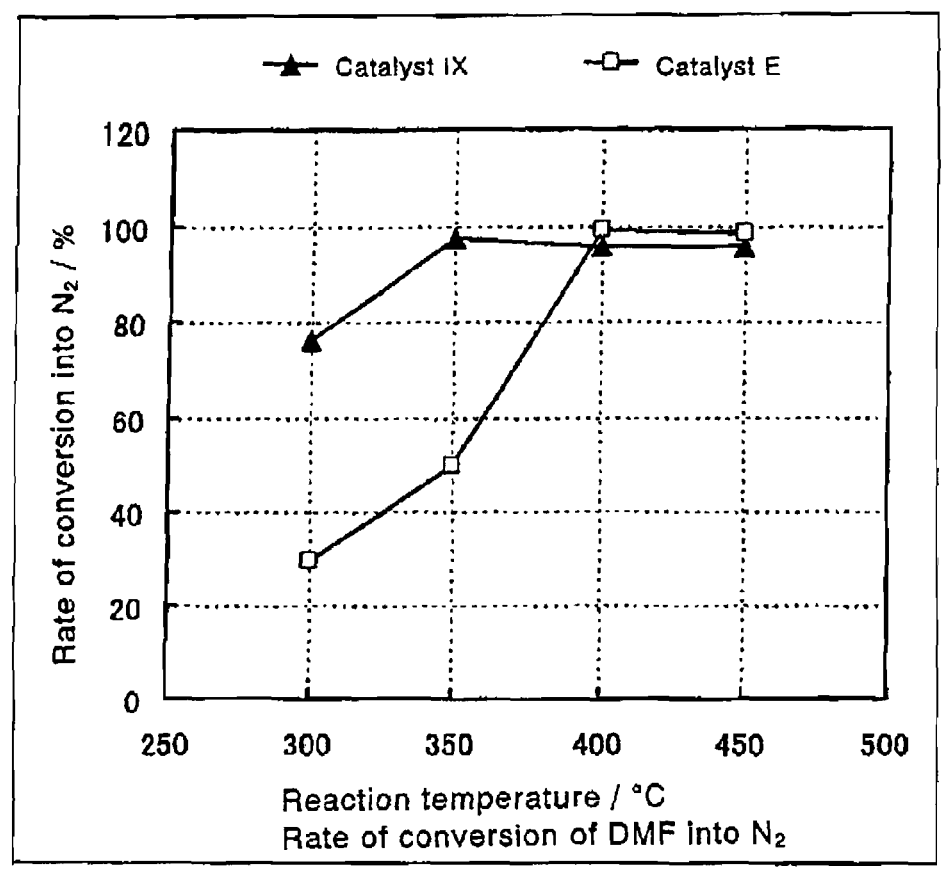
FIG. 2 shows the $N_2$ yields of Catalyst IX of the present Invention and Catalyst E as Comparative Example at 300 to 450° C.

Next, a comparison was made of the evaluation results on the catalyst of the present invention comprising a mixture of a copper oxide and zeolite (Catalyst IX), and the catalyst as the comparative example which was ion-exchanged with Cu (Catalyst E) (Table 5 and FIG. 2).

[Table 5]

TABLE 5

Results of evaluation of catalytic performance for DMF-containing gas: A comparison of CuO + H-zeolite (Catalyst IX) and Cu-substituted zeolite (Catalyst E)

| Catalyst | Reaction temp. °C. | DMF decomposition rate (%) | Yield (%) | | | | | |
|---|---|---|---|---|---|---|---|---|
| | | | $N_2$ | $NH_3$ | $NO_x$ | $N_2O$ | Other N-containing component | CO |
| IX | 300 | 100 | 76.2 | 14.6 | 0.5 | 0.2 | 8.5 | 6.8 |
| | 350 | 100 | 97.7 | 0.1 | 0.6 | 1.6 | 0 | 2.5 |
| | 400 | 100 | 96.0 | 0.0 | 0.8 | 3.2 | 0 | 0 |
| | 450 | 100 | 95.8 | 0.0 | 0.7 | 3.5 | 0 | 0 |
| E | 300 | 79 | 37.2 | 8.2 | 1.4 | 0 | 39.9 | 14.4 |
| | 350 | 98.8 | 31.7 | 10.6 | 0.4 | 1.3 | 34.8 | 28.1 |
| | 400 | 100 | 63.1 | 0.1 | 0.2 | 0 | 0 | 0 |
| | 450 | 100 | 99.2 | 0.0 | 0.2 | 0 | 0 | 0 |

Firstly, the DMF decomposition rate, at 300° C., of the catalyst of the present invention comprising a mixture of the copper oxide and zeolite (Catalyst IX) is 100%, while that of Cu-ZSM5 which is zeolite ion-exchanged with Cu (Catalyst E) is 79%, showing that the catalyst of the present invention has higher activity.

Furthermore, the $N_2$ selection rates, at 300 to 350° C., of Catalyst IX of the present invention are 76 to 98%, those of Catalyst E as the comparative example are 32 to 47%, showing that the catalyst of the present invention is also better in selectivity. In connection with the selection rates of CO ascribed to the hydrocarbon component of DMF, Catalyst IX of the present invention shows the rates of about 2 to 7% at 300 to 350° C., while Catalyst E as the comparative example gave the rates of 18 to 28%. These results show that the use of the catalyst of the present invention can suppress the formation of CO.

As is clear from the above findings, the catalyst of the present invention forms extremely small amounts of $NO_x$, $N_2O$ and CO, and can achieve conversion into $N_2$ at a high selection rate, even under the condition that the decomposition rate of the organic nitrogen compound is nearly 100%.

Evaluation Example 2

A gas containing ammonia was passed through the above-mentioned catalysts to evaluate catalytic activity. The composition of the gas used is as follows:

| | |
|---|---|
| Ammonia | 5000 ppm |
| $O_2$ | 10 mol % |
| Water | 2 mol % |
| Nitrogen | Remainder |

The conditions for measurement were the same as those in Evaluation Example 1.

Figure 3:
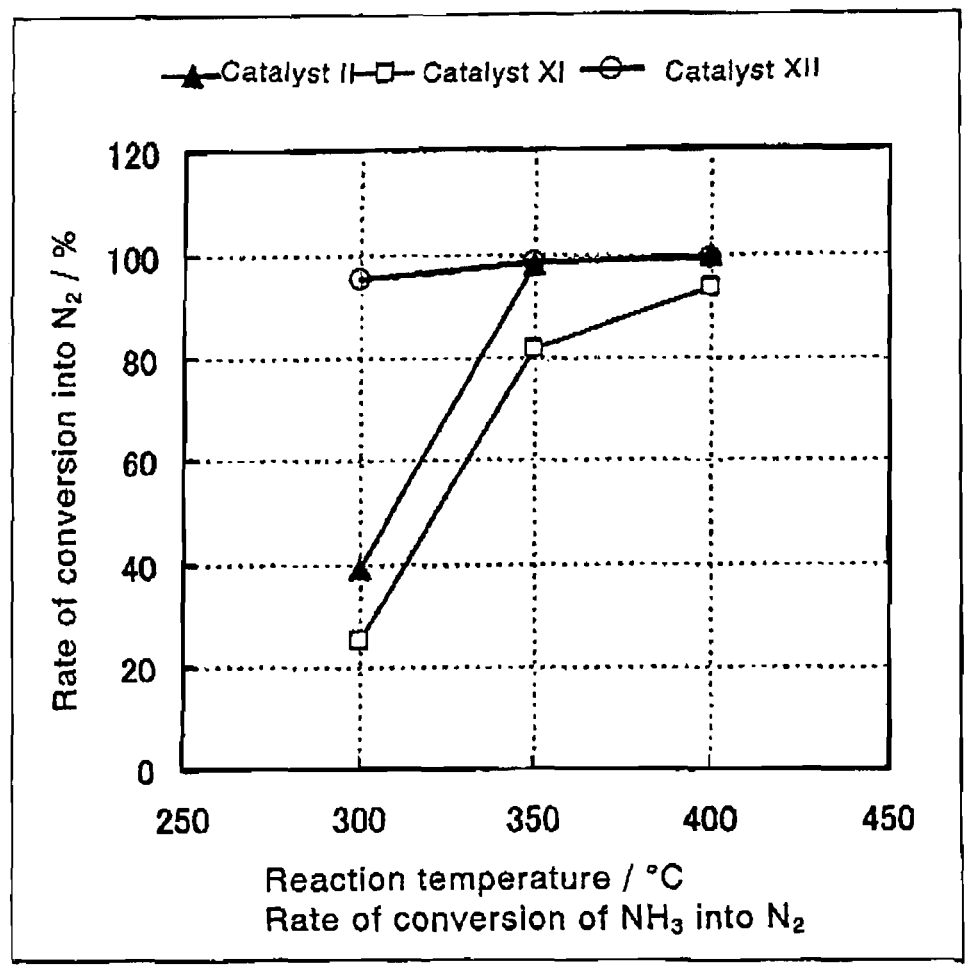
FIG. 3 shows the $N_2$ yields of Catalysts II, XI and XII of the present invention from ammonia at 300 to 400° C.

The evaluation results on Catalysts II, XI and XII are shown in Table 6 below and FIG. 3.

[Table 6]

TABLE 6

Results of evaluation of catalytic performance for $NH_3$-containing gas

| Catalyst | Temperature °C. | Decomposition rate of $NH_3$ (%) | Yield (%) | | |
|---|---|---|---|---|---|
| | | | $N_2$ | $NO_x$ | $N_2O$ |
| II | 350 | 99.7 | 98.3 | 0.0 | 1.4 |
| | 400 | 99.9 | 99.9 | 0.0 | 0.0 |
| XI | 350 | 99.3 | 82.0 | 0.0 | 17.3 |
| | 400 | 99.9 | 93.6 | 0.0 | 6.3 |
| XII | 350 | 100 | 98.6 | 0.1 | 1.3 |
| | 400 | 100 | 99.2 | 0.0 | 0.8 |

As shown in Table 6 and Table 3, the catalysts of the present invention clearly convert ammonia into $N_2$ at extremely high selection rates.

Table 7 shows a comparison of the DMF decomposition properties of the catalysts having compositions in which the type of zeolite is changed.

[Table 7]

TABLE 7

Results of evaluation of catalytic performance for DMF-containing gas

| Catalyst | Type of zeolite $SiO_2/Al_2O_3$ ratio | Reaction temp. °C. | DMF decomp. rate (%) | Yield (%) | | | | | |
|---|---|---|---|---|---|---|---|---|---|
| | | | | $N_2$ | $NH_3$ | $NO_x$ | $N_2O$ | Other N-containing component | CO |
| XII | H-mordenite 10.7 | 300 | 100 | 97.1 | 1.5 | 0 | 1.4 | 0 | 0 |
| | | 350 | 100 | 94.9 | 0 | 0.1 | 5 | 0 | 0 |
| | | 400 | 100 | 90.9 | 0 | 1.6 | 7.5 | 0 | 0 |
| | | 450 | 100 | 84.2 | 0 | 6.1 | 9.7 | 0 | 0 |

TABLE 7-continued

Results of evaluation of catalytic performance for DMF-containing gas

| Catalyst | Type of zeolite SiO$_2$/Al$_2$O$_3$ ratio | Reaction temp. °C. | DMF decomp. rate (%) | Yield (%) N$_2$ | NH$_3$ | NO$_x$ | N$_2$O | Other N-containing component | CO |
|---|---|---|---|---|---|---|---|---|---|
| XV | H-mordenite 18 | 300 | 100 | 97.5 | 0.1 | 0 | 1.8 | 0.6 | 0.6 |
| | | 350 | 100 | 94.7 | 0 | 0.2 | 5.1 | 0.4 | 0.1 |
| | | 400 | 100 | 89.6 | 0 | 2.6 | 7.8 | 0 | 0 |
| | | 450 | 100 | 84.2 | 0 | 5.8 | 10 | 0 | 0 |
| XVIII | β 25 | 300 | 100 | 84.87 | 0.5 | 0.1 | 4.1 | 0.5 | 0.7 |
| | | 350 | 100 | 92.7 | 0 | 0.1 | 7.1 | 0.1 | 0 |
| | | 400 | 100 | 88.8 | 0 | 1.2 | 10 | 0 | 0 |
| | | 450 | 100 | 83 | 0 | 7.8 | 9.2 | 0 | 0 |
| XIX | H-ZSM 30 | 300 | 100 | 95.9 | 0 | 0.1 | 4 | 0 | 0.1 |
| | | 350 | 100 | 95.4 | 0 | 0.5 | 4.1 | 0 | 0 |
| | | 400 | 100 | 94.7 | 0 | 1.4 | 3.9 | 0 | 0 |
| | | 450 | 100 | 93.5 | 0 | 3.4 | 3.1 | 0 | 0 |
| XX | H-ZSM 50 | 300 | 100 | 94.4 | 0 | 0.8 | 4.8 | 0 | 0.1 |
| | | 350 | 100 | 94.2 | 0 | 1 | 4.8 | 0 | 0 |
| | | 400 | 100 | 91 | 0 | 4.2 | 4.8 | 0 | 0 |
| | | 450 | 100 | 82.6 | 0 | 12.6 | 4.8 | 0 | 0 |
| G | H-mordenite 240 | 300 | 100 | 75.9 | 0 | 15.1 | 7 | 0 | 6.8 |
| | | 350 | 100 | 69.1 | 0 | 22.8 | 8.1 | 0 | 2.6 |
| | | 400 | 100 | 62.2 | 0 | 29.5 | 8.3 | 0 | 1 |
| | | 450 | 100 | 53.2 | 0 | 39.3 | 7.5 | 0 | 0.3 |
| H | Na-mordenite 18 | 300 | 100 | 71.8 | 0 | 21 | 7.2 | 0 | 1.6 |
| | | 350 | 100 | 63.1 | 0 | 29 | 7.9 | 0 | 0.3 |
| | | 400 | 100 | 58.8 | 0 | 33.7 | 7.5 | 0 | 0.1 |
| | | 450 | 100 | 52.6 | 0 | 41.3 | 6.1 | 0 | 0.1 |

Catalyst XII using H-mordenite (SiO$_2$/Al$_2$O$_3$ molar ratio 10.7) decomposes DMF at a rate of 100% at 300 to 450° C., converting it into N$_2$ at a rate of 84.2 to 97.1%. On the other hand. Catalyst H using Na-mordenite (SiO$_2$/Al$_2$O$_3$ molar ratio 10.7) decomposes DMF at a rate of 100%, but its rate of conversion into N$_2$ is 52.6 to 71.8%, increasing the yields of NO$_x$ and N$_2$O.

Catalyst G using H-mordenite having a SiO$_2$/Al$_2$O$_3$ molar ratio of 240 also gives a low N$_2$ conversion rate, as does Catalyst H.

By contrast, Catalyst XVIII using β-type zeolite, and Catalyst XIX and Catalyst XX, both using H-ZSM, attain high N$_2$ conversion rates. These catalysts are shown to decompose an organic nitrogen compound at a rate of 100%, involve little formation of by-products such as NH$_3$, NO$_x$, N$_2$O and CO, and achieve conversion into N$_2$ at a high rate.

Evaluation Example 3

Accelerated Durability Test

Catalyst XIV and Catalyst XV were subjected to the following evaluation:
Composition of a gas passed:

| Dimethylformamide (DMF): | 3000 ppm |
|---|---|
| O$_2$: | 10 mol % |
| Water: | 1 mol % |
| SO$_2$: | 2 ppm |
| Nitrogen: | Remainder |

A gas of the above composition was passed through the catalyst at SV of 20,000 hr$^{-1}$ and a temperature of 350° C. and, in this state, an operation was performed for 500 hours. Then, the catalyst was subjected to a DMF decomposition test under the conditions of Evaluation Example 1. The results of the activity test of the catalyst after 500 hours were as follows:

| | DMF decomposition rate (%) | N$_2$ yield (%) | CO yield (%) |
|---|---|---|---|
| Catalyst XIV: | 49.8 | 32.9 | 2.7 |
| | 100 | 90.7 | 14.6 |
| Catalyst XV: | 100 | 86.6 | 0.6 |
| | 100 | 90.5 | 2.7 |

Notes: Reaction temperature: 300° C. (upper), 350° C. (lower)

It is clear that Catalyst XV containing Pt, even in the presence of SO$_2$, minimally decreases in activity, maintains a high decomposition rate of the organic nitrogen compound, and minimally declines in the N$_2$ conversion rate. Because of the presence of Pt, this catalyst is effective, particularly, in increasing the N$_2$ yield and decreasing the CO yield at a relatively low temperature of 300° C.

The invention claimed is:

1. A catalyst composition comprising (a1) a copper oxide represented by the compositional formula CuO$_x$, where $0.45 \leq x \leq 1.1$, wherein the copper oxide is CuO or a mixture of CuO and Cu$_2$O (a2) a zeolite, and (a3) inorganic oxide particles selected from the group consisting of silica and titania having, carried thereon, one or more precious metals selected from the group consisting of Pt, Pd, Ru, Rh, Ir, and an alloy thereof, wherein a weight of the copper oxide relative to a sum of a weight of the copper oxide and a weight of the zeolite is in a range of 0.1 wt. % to 40 wt. %, wherein the zeolite is selected from the group consisting of mordenite, MFI-type, and β-type zeolites, and a SiO$_2$/Al$_2$O$_3$ molar ratio of the zeolite is 5 to 50, and the zeolite is one or more of zeolites of a proton type, or is one or more of zeolites ion-exchanged with a Group 8 metal, a Group 9 metal, a Group 10 metal or a Group 11 metal, and wherein the catalyst composition converts about 80% or more of the nitrogen in organic nitrogen compounds, ammonia, or a combination thereof in an exhaust gas to $N_2$ at a reaction temperature of 350° C.

2. A catalyst composition formed by mixing (a1) copper oxide particles represented by the compositional formula $CuO_x$, where $0.45 \leq x \leq 1.1$, and wherein the copper oxide particles are CuO particles or a mixture of CuO and $Cu_2O$ particles, (a2) particles of a zeolite, and (a3) inorganic oxide particles selected from the group consisting of silica and titania having, carried thereon, one or more precious metals selected from the group consisting of Pt, Pd, Ru, Rh, Ir, and an alloy thereof, wherein a weight of the copper oxide particles relative to a sum of a weight of the copper oxide particles and a weight of the zeolite is in a range of 0.1 wt. % to 40 wt. %, wherein the zeolite is selected from the group consisting of mordenite, MFI-type, and β-type zeolites, and the zeolite is one or more of zeolites of a proton type, or is one or more of zeolites ion-exchanged with a Group 8 metal, a Group 9 metal, a Group 10 metal or a Group 11 metal, and a $SiO_2/Al_2O_3$ molar ratio of the zeolite is 5 to 50, and wherein the catalyst composition converts about 80% or more of the nitrogen in organic nitrogen compounds, ammonia, or a combination thereof in an exhaust gas to $N_2$ at a reaction temperature of 350° C.

3. The catalyst composition according to claim 1 or claim 2, further containing a manganese oxide.

4. The catalyst composition according to claim 3, wherein a weight of the manganese oxide relative to a sum of a weight of the copper oxide and a weight of the zeolite is in a range of 0.1 wt. % to 10 wt. %.

5. The catalyst composition according to claim 1 or claim 2, wherein a sum of weights of the one or more precious metals selected from the group consisting of Pt, Pd, Ru, Rh, Ir, and an alloy thereof relative to the sum of the weight of the copper oxide and the weight of the zeolite is in a range of 1 ppm to 500 ppm.

6. The catalyst composition according to claim 1 or claim 2, wherein the $SiO_2/Al_2O_3$ molar ratio of the zeolite is 5 to 30.

7. A catalyst for purifying an exhaust gas containing an organic nitrogen compound, ammonia, or a combination thereof, the catalyst comprising: a catalyst substrate; and a catalyst layer formed on the catalyst substrate and containing the catalyst composition according to claim 1 or claim 2.

* * * * *